July 22, 1958 D. V. BROTHERS ET AL 2,844,662
ANNUNCIATING WEIGHING MACHINE
Filed Nov. 12, 1954 2 Sheets-Sheet 1
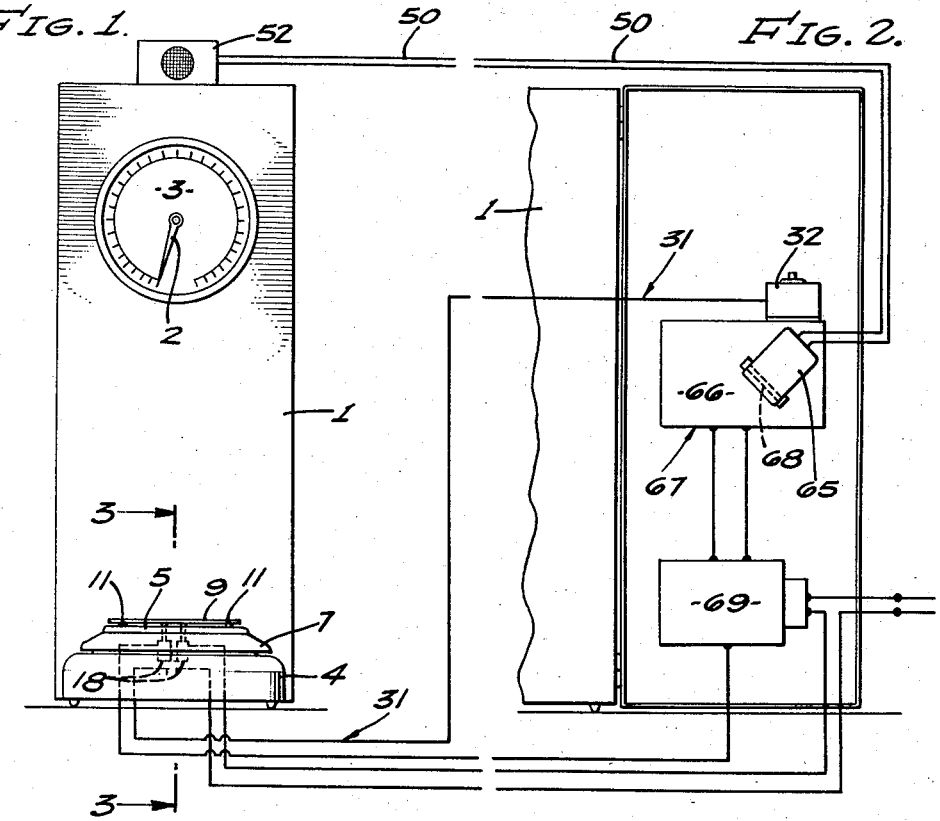
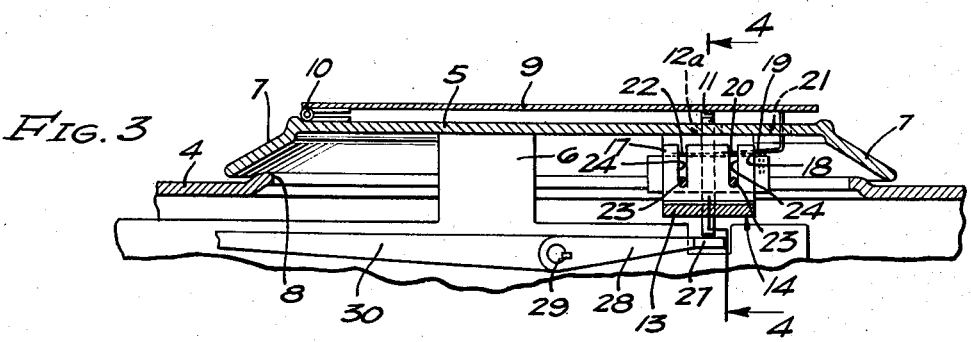
DAVID V. BROTHERS
FRANCIS D. AMMEN
INVENTORS
BY Francis D. Ammen
ATTORNEY

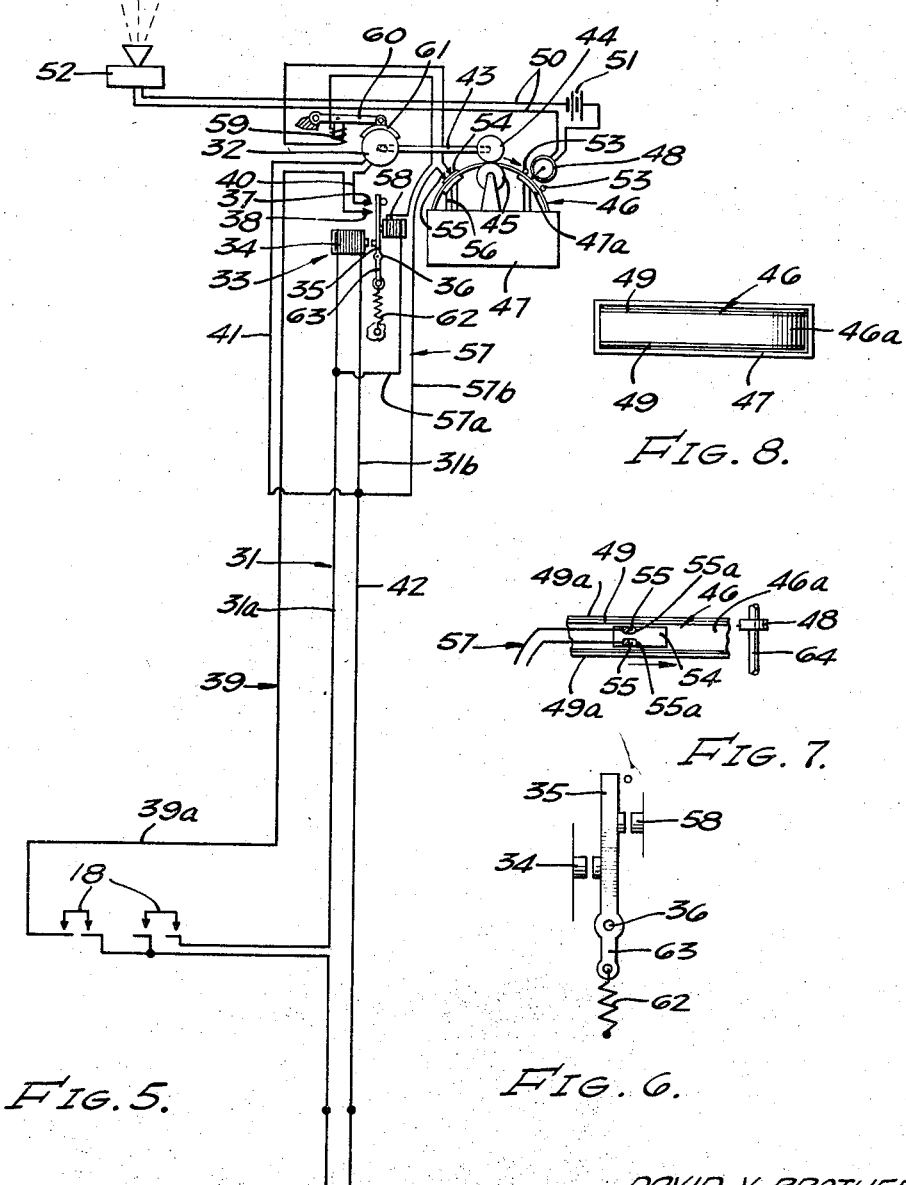

2,844,662
ANNUNCIATING WEIGHING MACHINE

David V. Brothers and Francis D. Ammen, Los Angeles, Calif., assignors, by direct and mesne assignments, to Talking Scales, Inc., a corporation of California Application November 12, 1954, Serial No. 468,294

9 Claims. (Cl. 179—100.1)

This invention relates to an accessory for weighing scales such as are usually placed in public places, and which include a depressible platform on which a person desiring to be weighed, stands. This depresses the platform and actuates a pointer on the dial that indicates the amount of weight on the scale.

In accordance with this invention a scale such as referred to, is provided with means for announcing a message to the person standing on the platform of the scale. This is for advertising purposes or other purposes.

One of the objects of the invention is to provide automatic means associated with the weighing scale, which will be activated by the depressing of the platform, and will operate to deliver a message from a concealed record preferably within the casing of the machine; and which will operate in such a way that after the delivery of the message the controlling parts of the control mechanism for operating the record will be restored to their normal position of rest.

The accessory mechanism is preferably carried on the inside of the back cover of the casing, except the loud speaker which is preferable at the top of the casing.

Another object of the invention is to provide associated control mechanism for the weighing scale which will enable the record to be changed at will by substituting a new "cartridge" that carries a different recording.

Further objects of the invention will be evident from a careful reading of the following specification and study of the accompanying drawing.

The invention consists in the novel parts and combinations of parts to be described hereinafter, all of which contribute to produce an efficient annunciating weighting scale.

A preferred embodiment of the invention is described hereinafter, in the following specification, while the broad scope of the invention is pointed out in the appended claims.

In the drawing:

Figure 1 is a front elevation of an annunciating weighing scale embodying this invention. This view is more or less diagrammatic and illustrates portions of the wiring broken away.

Figure 2 is an elevation of the inner face of the back cover of the machine, and in a diagrammatic way, illustrates casings that carry the control mechanism, and that are attached on the inner face of the cover. This view shows a portion of the casing of the machine broken away near the hinges on which the cover swings open.

Figures 2 and 3 show portions of the wire diagrams that match together so that both views can be read as one illustration.

Figure 3 is a vertical section taken in the plane of the line 3—3 shown in Figure 1, certain parts being broken away and shown in partial section.

Figure 4 is a vertical section taken about in the plane of the line 4—4 of Figure 3, Figure 5 is a diagrammatic view of the mechanism and the wiring that connects the operating parts of the mechanism.

Figure 6 is a detail upon an enlarged scale of an armature that is under the influence of two electro-magnets to control its movements, which in turn effects the closing and opening of circuits that co-operate to deliver the message and return the armature to its normal, neutral position.

Figure 7 is a detailed view, and is a plan upon a larger scale of a short portion of the record carrying the message, and which in the present instance is an endless belt of plastic material capable of performing the functions of a wax record, such as are frequently used in connection with the operation of the load speakers of phonographs.

Figure 8 is a plan of one of the "cartridges" that carries the record.

Referring more particularly to the parts, and especially to Figures 1 to 4 inclusive, the weighing machine illustrated includes the usual casing 1 or upright housing for the weighing machine's mechanism that is activated in any common way by a depressible platform, and the weighing mechanism may activate a pointer 2 on a dial 3 that indicates the amount of the weight on the weighing platform.

That mechanism however, constitutes no part of the present invention.

In adapting such a scale to the purposes of this invention the foot 4 of the casing 1 that projects outwardly over the floor, usually is surmounted by the depressible platform 4, as indicated in Figures 3 and 4, so that it covers a relatively fixed plate 5 of the machine. The side portions of this fixed plate 5 are supported on two columns 6 that are spaced apart from each other as shown in Figure 4. This fixed plate 5 may be provided with an inclined integral apron 7 that screens the edge of an opening 8 formed in the upper wall of the foot 4.

On the upper side of the plate 5 a depressible platform or plate 9 is supported. In the present instance this platform is attached to the upper side of the cover plate 5 by means of a hinge joint 10. This hinge connection, in the present instance, is located at the end of the depressible platform 9 that is located adjacent to the upright housing or casing 1 of the scale.

In order to adapt this platform 9 so that it can close a control switch to put the recording mechanism into operation, we prefer to provide two laterally spaced plungers 11 which are in the form of stems, the lower ends of which are guided respectively down through openings 12 in the bottom wall 13 of a transversely disposed housing 14. The side walls of this housing are shown in Figure 4 carrying inwardly extending flanges 15 that are welded as at 16 to the under side of the plate 5.

The bottom wall 13 of the housing 14 carries an angle bracket 17 for supporting switch-means for closing a circuit or circuits for starting and driving the record that carries the message to be announced. In the present instance this bracket 17 carries two micro-switches 18 each of which carries a movable contact 19 which when depressed, will close a circuit that is instrumental to control the starting of the record. Each of the switches 18 has an actuator 20 that has a vertical extension that passes up through an opening 21 in the plate 5, and the end of which rests against the under face of the depressible platform 9.

Each actuator 20 includes a horizontal extension the end 22 of which is secured to the upper face of the switch casing. The portion of this actuator near the vertical extensions referred to, rests on the end of the movable pin 19 of that switch. With this arrangement, when the platform 9 is depressed the actuator 20 will push down the pin 19 and close the switch.

In order to enable the switches 18 to be adjustable in a vertical direction, they are provided with two through-bolts 23 that lie in slots 24 that extend down through the vertical extension of the angle bracket 117. These can be loosened and adjusted up or down in their slots to raise or lower the actuator 20.

The plungers 11 are guided above through openings 12a in plate 5, and their upper ends are provided with threads. They carry nuts 25 respectively, which can be adjusted on the threads to compress more or less, two light coil springs 26, the lower ends of which are supported on the bottom 13 of the housing 14.

The upper ends of these plungers support the free end of the depressible platform 9 (see Figures 3 and 4). Their lower ends lie adjacent to a cross-head 27 which cross-head extends transversely on the end of the short arm 28 that is carried by a cross-shaft 29. The long arm 30 of this lever extends into the lower end of the housing 1 of the scale, and its upward movement effects the weighing operation and imparts corresponding movements to the pointer 2 that indicates the amount of weight on the platform 9.

Referring again to Figures 1, 2 and 5, when the two switches 18 are closed by the depression of the platform 9, circuits are closed respectively by these switches including a starting circuit 31 for the motor 32. The motor 32 drives the record.

The circuit 31 includes the conductors 31a and 31b that supply current to the relay 33 that includes an electromagnet 34 and an armature 35. This circuit becomes closed when the right hand switch 18 closes as the platform 9 is depressed by a weight upon it. This energizes the magnet 34 which then attracts the armature 35 that is mounted on a pivot 36.

As the upper end of the armature which, of course, is of conductive material, touches two contacts 37 and 38 thereby closing a motor circuit 39 through the left hand switch 18 and by conductor 39a to contacts 38, and 37 by wire 40, and returning from the motor by conductor 41 to return conductor 42.

This starts the motor 19 which through shaft 43 drives a roller 44. Between this roller and another knurled roller 45 below it an endless record tape 46 passes which is disposed in a loop extending up out of the left end of its container or "cartridge" 47 in the direction indicated by the arrows shown in Figures 5 and 7.

However the direction of movement of the tape record is immaterial. In its movement it passes across the upper face of an arcuate guide plate 47a above which is located a pick-up 48 the needle or stylus of which runs in one of the record grooves 49 on the record tape 46. This pick-up is on a circuit 50 including a battery 51 or other source of E. M. F.

This circuit 50 extends up to a loud speaker 52 which in the present instance is mounted above the casing 1.

In order to insure accuracy of reproduction of the sound two presser rollers 53 may be located above the guide platen 47 to contact the upper face of the tape 46 to assist in guiding it across the platen.

In order to stop the tape after the recorded message on the tape has been delivered we provide the outerside of the tape with a small patch or section 54. This patch 54 is of conductive flexible material. It is, of course, located on the tape so that it follows the ending of a message.

When this conductive patch 54 arrives under two contacts 55 that are held fixed above a guide platen 56 the conductive patch 54 bridges the current of a circuit 57 which energizes a second electro-magnet 58 located on the opposite side of the armature 35 from the magnet 34. This second magnet 58 is further from the pivot 36 than the first magnet 34, and is also a more powerful magnet. This enables it to overpower the forces exerted by the magnet 34, and enables it to withdraw the armature from the weaker magnet 34 and pull it up against a fixed stop shown in Figure 5 at the right of the free end of the armature 35. This circuit 57 is completed through conductors 57a and 57b.

This, of course, opens the motor circuit at the contacts 55. Furthermore, the circuit 57 passes up to a solenoid 59 the core of which is attached to a lever 60 carrying a brake 61 for the motor. This stops the motor practically instantly, and before the conductive patch has passed out of engagement with the contacts 55.

Then, as soon as the person standing on the platform steps off of it, circuit 57 which is fed by current from right hand switch 18 becomes open at that switch.

This, of course, liberates the armature 35 which is maintained in its normal, neutral position between the two electromagnets by a coil spring 62 that is attached to the end of a tail arm 63 that extends down from its pivot point 36.

The record tape 46 is preferably composed of a plastic having highly insulating properties. As indicated in Figure 7, the record grooves 49 are preferably located adjacent the side edges 49a of the tape. This location is most advantageous because it leaves a zone 46a extending along the middle of the tape, wide enough to receive a conductive contact patch 54 that is so narrow that its area is confined to the space between the recording grooves 49. This, of course, avoids any rubbing of the contact stems 55 over the recording part of the tape that carries the recording grooves.

The lower ends of these conatct pins 55 terminate in flattened brushes 55a that press yieldingly upon the upper face of the tape as it passes. The tips of the brushes 55a project from their stems in the direction that the tape passes away from them, so they can slide freely onto and over the first edge of any patch as it passes over them.

The casing of the pick-up 44 is mounted on a transverse arbor 64 on which should have a set-screw (not illustrated) on its hub for securing it within reach of the recording groove 49 in which it is to run.

In practice the mechanism attached to the cover may include a housing 69 for a converter for A. C. current.

The cartridge 47 is mounted within a box 65, see Figure 2, secured on the cover 66 of the main casing 67 that houses most of the mechanism described above except the motor 32 which is seated on the upper wall of the casing 66. Access to the interior of the cartridge box is had by swinging its cover up on a hinge-pin 68.

If desired, a set of cartridges can be used with different messages, advertising or otherwise, for example, in certain localities in tourists itineries, local sights that tourists could be brought to see.

In a machine now built operating in accordance with this invention the messages can be delivered in 10 seconds, fifteen seconds, depending upon the length their recordings require on the tape, and the locations of the conductive areas or patches 54.

Many other embodiments of this invention may be resorted to without departing from the spirit of this invention.

We claim as our invention, and desire to secure by Letters Patent:

1. An annunciating weighing scale including the combination of a depressible platform upon which a person may stand to be weighed, a movable record capable of carrying a plurality of record grooves bearing messages to be announced, an electric motor with a driving connection to the record for driving the same, a motor circuit for driving the motor, a first control circuit with means for closing the same by the depression of said platform, a relay switch having an electro-magnet connected into the first control circuit, an armature cooperating with the electro-magnet to be attracted and released thereby, means cooperating with the armature for closing the motor circuit; a stylus and pick-up to cooperate with the record, a second control circuit having means therein for effecting the opening of the motor circuit; and means on the record located thereon in a position for effecting the closing of said second control circuit after the delivery of said message, and means controlled by the closing of the second control circuit to open the motor circuit.

2. An annunciating weighing scale according to claim 1, in which the record is an endless belt of non-conductive material; and in which the stylus and pick-up are mounted for lateral movement across the record for placing the stylus in any of the record grooves; and in which the means on the belt to effect the opening of the motor circuit is of conductive material; and including two fixed contacts in the second control circuit for closing the circuit through the said conductive material, that effects the opening of the motor circuit.

3. An annunciating weighing scale according to claim 2, in which the said record is composed of an insulating material; and in which the means for starting the motor includes an electromagnet, and an armature for the same in the local motor circuit; and including a second electromagnet for withdrawing the said armature from the influence of the first named electromagnet having its own control circuit; a conductive area on said endless non-conductive record belt, and means cooperating with said conductive area for closing said second named control circuit for enabling the same to effect the said withdrawal of the armature to open the motor circuit and stop the motor.

4. An annunciating weighing scale according to claim 2, in which the said armature is pivoted, and the said electromagnets are located on opposite sides of the armature; and including means for normally holding the armature in a position of rest uninfluenced by either of said electromagnets when the weighing scale is at rest and neither of the electro-magnets is energized.

5. An annunciating weighing scale according to claim 2, including switch means associated with the depressible platform closed by the depressing of the platform, for closing the said motor circuit, and a return spring for the depressible platform for raising the platform to its normal position and thereby effecting the opening of the said switch-means.

6. An annunciating weighing scale according to claim 4, in which the said means for normally holding the armature in its said position of rest includes a coil spring and a tail arm on the pivoted armature to which the said spring is attached.

7. An annunciating weighing scale according to claim 3, in which the electromagnet in the second control circuit is further from the pivot than the first named electromagnet and of greater power than the electromagnet in the first circuit so as to be capable of exerting a greater attractive force upon the said armature than said first named electromagnet that is located on its opposite side.

8. An annunciating weighing scale according to claim 1, in which the record is an endless belt having a plurality of recorded grooves adjacent to each other extending along said belt and carrying recorded messages, and in which the pick-up and stylus have means for supporting the same above the belt, and so that the stylus can track in any one of said grooves, and a conductive patch attached on said belt out of line with said grooves, one of said control circuits having means controlled thereby for opening the motor circuit, said control circuit having two fixed contacts bridged by said conductive patch and operating to open said motor circuit.

9. An annunciating weighing scale according to claim 8, in which the belt has two sets of recorded grooves lying respectively adjacent the side edges of the belt; and in which the said patch is located on the belt between the two sets of grooves.

References Cited in the file of this patent

UNITED STATES PATENTS

| | | |
|---|---|---|
| 789,336 | Poulsen et al. | May 9, 1905 |
| 1,924,652 | Rivas | Aug. 29, 1933 |
| 2,107,888 | Dean | Feb. 8, 1935 |
| 2,289,555 | Simons | July 14, 1942 |
| 2,561,602 | Valentino | July 24, 1951 |
| 2,604,547 | Sack | July 22, 1952 |
| 2,615,993 | Carter | Oct. 28, 1952 |